United States Patent [19]

Peng et al.

[11] Patent Number: 4,961,016
[45] Date of Patent: Oct. 2, 1990

[54] DUAL-FACE COOLING FAN FOR A DYNAMOELECTRIC MACHINE

[75] Inventors: Yuchi P. Peng, Noblesville; Melvin H. Hallmann, Middletown; Robert W. Ward, Anderson, all of Ind.

[73] Assignee: General Motors Corporation, Detroit, Mich.

[21] Appl. No.: 394,982

[22] Filed: Aug. 9, 1989

[51] Int. Cl.$^5$ .............................................. H02K 9/06
[52] U.S. Cl. ...................................... 310/62; 310/63; 310/59; 310/68 D; 310/89
[58] Field of Search ........................ 310/52, 64, 62, 65, 310/63, 89, 58, 239, 59, 261, 68 D, 263, 254; 415/98, 103; 416/184, 199

[56] References Cited

U.S. PATENT DOCUMENTS

| | | | |
|---|---|---|---|
| 3,127,094 | 3/1964 | Smith | 416/184 |
| 3,184,625 | 5/1965 | Farison | 310/60 R |
| 3,198,972 | 8/1965 | Larson | 310/60 R |
| 3,422,339 | 1/1969 | Baker | 310/68 R |
| 3,538,362 | 11/1970 | Cheetham et al. | 310/68 D |
| 4,162,419 | 7/1979 | DeAngelis | 310/62 |
| 4,418,295 | 11/1983 | Shiga | 310/59 |
| 4,419,597 | 12/1983 | Shiga et al. | 310/64 |
| 4,492,885 | 1/1985 | Kitamura et al. | 310/68 D |
| 4,530,639 | 7/1985 | Mowill | 415/98 |
| 4,604,538 | 8/1986 | Merrill et al. | 310/68 D |
| 4,659,950 | 4/1987 | Gotoh | 310/59 |
| 4,757,221 | 7/1988 | Kurihashi | 310/62 |
| 4,794,285 | 12/1988 | Mimura | 310/62 |

FOREIGN PATENT DOCUMENTS

| | | | |
|---|---|---|---|
| 0712910 | 10/1941 | Fed. Rep. of Germany | 416/184 |
| 2632536 | 1/1978 | Fed. Rep. of Germany | 416/184 |
| 0789930 | 10/1935 | France | 310/62 |
| 0883020 | 6/1943 | France | 416/199 |
| 1404940 | 5/1965 | France | 310/62 |
| 0587514 | 4/1947 | United Kingdom | 416/184 |

Primary Examiner—R. Skudy
Attorney, Agent, or Firm—A. Michael Tucker

[57] ABSTRACT

A dual-face, internally-mounted cooling fan is provided in a dynamoelectric machine, e.g. an alternating current generator. The generator includes a ventilated housing supporting a stator assembly and a rotor assembly. The fan includes a divider disk having a plurality of blades provided on each surface and is mounted to rotate with the rotor assembly. As the fan is rotated, a plurality of separate air currents are drawn axially into the housing for cooling. The divider disk prohibits substantial mixing of currents drawn from opposite ends before they are radially expelled from the housing.

2 Claims, 1 Drawing Sheet

DUAL-FACE COOLING FAN FOR A DYNAMOELECTRIC MACHINE

BACKGROUND OF THE INVENTION

1. FIELD OF THE INVENTION

The present invention relates generally to air cooling of a dynamoelectric machine. In particular, this invention is concerned with a dual-face cooling fan mounted inside the housing of an alternating current generator for a vehicle.

2. DESCRIPTION OF THE RELATED ART

It is well-known to cool alternating current generators and other dynamoelectric machines with airflow created by rotating fans. Various combinations of external and internal fans have been incorporated in generators. Generally, air is forced or drawn into a housing in an axial direction along a rotating shaft. The air is expelled radially through vents in the outer surface of a cylindrical housing.

In order to increase airflow and its cooling effect, many generators employ two fans. For example, an external fan can be combined with an internal fan in a generator to increase airflow through the housing. Representative examples of generators having both an external fan and an internal fan include the following U S. Pat. Nos.: 3,422,339; 4,162,419 and 4,604,538. In other machines, a pair of internal fans mounted in series produce cooling airflows which may mix inside a housing before being expelled. Representative examples of generators employing two internal fans include the following U.S. Pat. Nos.: 3,184,625; 3,198,972; 4,418,295; 4,419,597; 4,757,221 and 4,794,285.

The art continues to seek improvement. It is desirable that airflow through a housing be increased to cool the internal components of a dynamoelectric machine. Furthermore, it is desirable that a plurality of separate airflow currents through a housing be provided to increase the cooling efficiency of a fan.

SUMMARY OF THE INVENTION

The present invention includes a dual-face, internally-mounted, cooling fan for a dynamoelectric machine. The fan is particularly adaptable for use in an alternating current generator. The fan draws a plurality of separate airflow currents through the generator housing and expels the currents before substantial mixing of the currents occurs.

In a preferred embodiment, the present invention includes a dual-face, internally-mounted cooling fan for a dynamoelectric machine, e.g. an alternating current generator. The generator includes a ventilated housing supporting a stator assembly and a rotor assembly. The fan includes a divider disk having a plurality of blades provided on each surface and is mounted to rotate with the rotor assembly. As the fan is rotated, a plurality of separate air currents are drawn axially into the housing for cooling. The divider disk prohibits substantial mixing of the currents drawn from opposite ends before they are radially expelled from the housing.

DETAILED DESCRIPTION OF THE PREFERRED EMBODIMENTS

Figure 1:
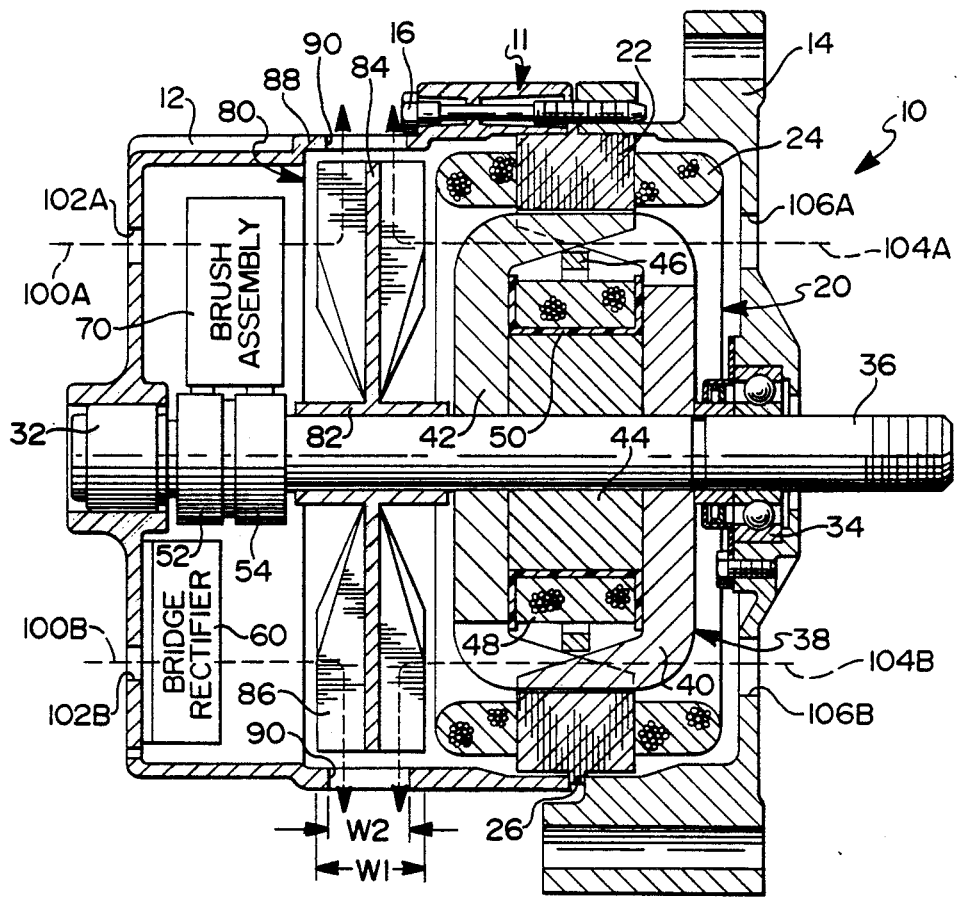
FIG. 1 is an axial sectional view of a preferred embodiment of an alternating current generator incorporating an internal dual-face fan of the present invention.

A diode-rectified alternating current generator, indicated generally at 10, is illustrated in FIG. 1. A generator of the type illustrated in FIG. 1 can be found in U.S. Pat. No. 3,538,362, titled "Diode-Rectified Alternating Current Generator Having A Built-In Transistor Voltage Regulator", issued Nov. 3, 1970, assigned to the assignee of the present and hereby incorporated by reference.

The generator 10 includes a generally cylindrical housing 11 formed by end frames 12 and 14. End frames 12 and 14, formed from a metallic material and preferably of cast aluminum, are removably connected by a plurality of bolts 16, only one of which is illustrated in FIG. 1.

End frames 12 and 14 support a stator assembly, indicated generally at 20. The stator assembly 20 includes a conventional magnetic stator core 22 formed of steel laminations having slots that receive a conventional three phase Y- or delta-connected stator winding designated by 24. Some of the laminations of the stator core 22 have a large diameter and are indicated at 26. These large diameter laminations 26 are clamped between the end frames 12 and 14.

End frames 12 and 14 carry bearings 32 and 34 which rotatably support a shaft 36 that forms a part of a rotor assembly, designated generally by 38. The rotor assembly 38, in addition to the shaft 36, carries pole members 40 and 42 and a core 44 formed of magnetic material. The pole members 40 and 42 have conventional interleaved fingers (not illustrated). An aluminum ring 46 engages an inner surface of pole members 40 and 42. The rotor assembly 38 further includes a field coil 48 which is wound on a spool 50 positioned about core 44 and between the pole members 40 and 42. The opposite ends of the field coil 48 are electrically connected with slip rings 52 and 54 which are suitably electrically insulated from each other and from the shaft 36.

The three phase stator Y- or delta-connected stator winding 24 is electrically connected with conventional terminal studs and heat sinks provided in a bridge rectifier assembly, schematically illustrated and indicated at 60. A bridge rectifier assembly compatible with generator 10 is described in U.S. Pat. No. 3,538,362 and hereby incorporated by reference.

A brush unit, schematically illustrate and indicated at 70, is disposed adjacent the rotary shaft 26. The brush assembly 70 includes brushes (not illustrated) held in contact with slip rings 52 and 54 by respective springs (not illustrated).

Figure 2:
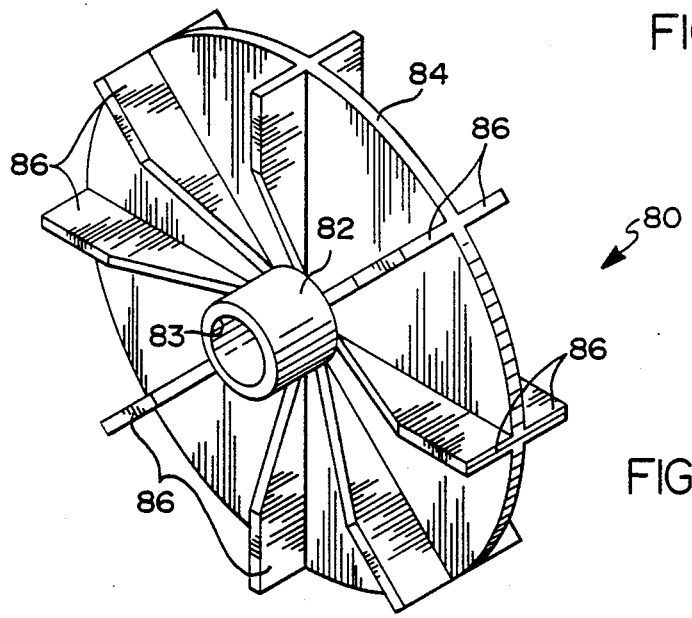
FIG. 2 is a perspective view of the dual-face fan removed from the generator of FIG. 1 for purposes of clarity of illustration.

A dual-face fan assembly 80 is mounted on the rotary shaft 36 to produce a plurality of separate cooling air currents through the generator housing 11. The fan assembly 80, illustrated best in FIG. 2, includes a cylindrical sleeve portion 82 having a central opening 83 for receiving the shaft 36. The sleeve portion 82 can be secured to the shaft 36 by any suitable means, including press-fitting. A divider disk 84 is provided on the sleeve portion 82 and oriented so that its plane is approximately perpendicular to the axis of the sleeve portion 82. A plurality of fan blades or vanes 86 are provided on each surface of the disk 84.

End frame 12 includes a cylindrical portion, indicated generally at 88, for housing the fan assembly 80. A plurality of vents 90 are provided in the circumference of the cylindrical portion 88. It is preferred that the divider disk 84 and blades 86 extend to within a small distance of the inner surface of the cylindrical portion 88 to prevent any substantial mixing of air currents drawn into the housing 11. For example, the distance between the ends of blades 86 and the inner surface of the cylindrical portion 88 can be 1 mm. The extension of blades 86 to within a small distance of the inner surface of cylindrical portion 88 provides more air flow than conventional, shorter blades found in the prior art. It is also preferred that the width W1 of blades 86 is slightly greater than the width W2 of vents 90, e.g. in the range of 1.5 mm to increase the expulsion of air from the housing 11.

As the shaft 36 and attached fan assembly 80 are rotated, a first pair of air currents 100A and 100B enters the end plate 12 through vents 102A and 102B and is drawn axially along rotary shaft 26. Air currents 100A and 100B are redirected to a radial flow by the blades 86 and disk 84, and exit the interior portion of end frame 12 through vents 90 in the cylindrical portion 88. A second pair of air currents 104A and 104B is drawn axially through the rotary assembly 38 and stator assembly 20 through vents 106A and 106B in the end frame 14. As the air currents 104A and 104B encounter blades 86 and disk 84, they are redirected to radial flow and exit the end frame 12 through vents 90. The divider disk 84 which extends to within a small distance of vents 90 prevents any substantial mixing of air currents 100A, 100B and 104A, 104B before they exit the housing 11, thereby increasing the cooling efficiency of the fan assembly 80.

The present dual-face fan assembly 80 can be incorporated in any dynamoelectric machine. For example, a dual-face cooling fan can be provided in numerous types of generators and alternators, as well as AC motors and DC motors. In such assemblies, vents can be provided adjacent the rotary shaft of the dynamoelectric machine to permit axial air flow into the end plates of the machine housing. As air currents encounter the divider disk or a central divider of the dual-face fan assembly 80, they will be redirected to radial flow and exit through vents provided in the outer circumference of the cylindrical surface of the housing. The divider disk prevents substantial mixing of separate airflow currents before they are expelled from the housing, thereby increasing the cooling efficiency of the machine.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A dynamoelectric machine comprising:
   (a) a housing having ventilated first and second end frames, wherein the second end frame includes a cylindrical portion having a plurality of circumferential vents;
   (b) fastener means for removably connecting the first and second end frames;
   (c) a stator assembly and a rotor assembly mounted in a chamber formed by the first end frame, the rotor assembly including a rotatable shaft extending into a chamber formed by the second end frame;
   (d) heat-generating means mounted in the chamber formed by the second end frame;
   (e) a dual-face cooling fan assembly having a sleeve portion mounted on the shaft in the chamber formed by the second end frame so that the fan assembly is mounted between the stator and rotor assemblies and the heat-generating means and adjacent the cylindrical portion of the second end frame, the fan assembly including
       (i) a divider disk mounted on the sleeve portion having a diameter slightly less than the inner diameter of the cylindrical portion, and
       (ii) a plurality of blades provided on each surface of the disk wherein the blades extend to a diameter slightly less than the inner diameter of the cylindrical portion;
   whereby as the fan assembly rotates with the shaft, a plurality of separate air currents are drawn axially through the housing from opposite end frames into the divider disk and then radially expelled from the housing through the circumferential vents without substantial mixing of the air currents.

2. The dynamoelectric machine as specified in claim 1 wherein the blades on the disk have a combined width slightly greater than the width of the circumferential vents.

* * * * *